3,363,988

CATALYST AND PROCESS FOR FLUIDIZED DECOMPOSITION OF HYDROCARBONS TO PRODUCE HYDROGEN

John C. Hayes, Palatine, Ill., assignor to Universal Oil Products Company, Des Plaines, Ill., a corporation of Delaware No Drawing. Filed Jan. 4, 1965, Ser. No. 423,380
4 Claims. (Cl. 23—212)

The present invention is directed to the use of an improved catalyst for effecting the fluidized production of hydrogen by the catalytic decomposition of a gaseous hydrocarbon stream. More particularly the invention is concerned with the preparation of a subdivided alumina-nickel catalyst such that there is a minimization of nickel migration from the catalyst and an elimination of clinker formation in the fluidized processing system.

Hydrocarbon oils and gases, such as are readily and abundantly available as a result of petroleum processing, are an excellent source of hydrogen and a considerable number of processes have been designed to effect the conversion of said hydrocarbons to hydrogen. The normally gaseous hydrocarbons, such as methane, because of the high ratio of hydrogen to carbon, are considered to be a particularly attractive source of hydrogen. The decomposition of hydrocarbons to hydrogen has been effected at high temperature decomposition conditions in the presence of supported Iron Group metals. It is generally considered that higher conversions are most readily attained through the combined effect of an acid-acting cracking catalyst, such as silica-alumina, as a supporting material. However, it has now been determined that a catalyst consisting of alumina, which is comparatively neutral, and a metal of Group VIII, and in particular, nickel, exhibits considerably greater activity with respect to the decomposition of normally gaseous hydrocarbons to hydrogen than does a catalyst consisting of silica-alumina and nickel. In other words, the comparatively neutral alumina unexpectedly imparts a higher degree of activity to the catalyst than does the acid-acting high silica content silica-alumina catalyst, and this is so despite the recognized superiority of silica-aluminas as gas oil cracking catalysts.

In carrying out a continuous hydrogen producing operation on a commercial scale, it is advantageous to utilize a fluidized or moving bed system to effect an efficient catalytic contact with the hydrocarbon stream. It is also of advantage to provide for the continuous fluidized transporting of the catalyst particles from the reaction zone to the regeneration zone for carbon removal and from the latter back to the reaction zone; however, it has been found that most of the alumina base catalysts are more susceptible to rapid attrition in a fluidized bed type of conversion system and that the catalyst loss may be too high for a successful commercial use. As a result, substantial research and experimental work has been undertaken to improve the strength or attrition resistance characteristics of a decomposition catalyst composite utilizing a carrier material which is substantially all alumina.

In addition to the problem of attrition resistance, it has been found that the nickel containing composites provide a problem of clinker formation in the system. All aspects of this clinker formation are not necessarily fully understood, although it is known that the agglomerations or clinkers that form in the system to block valves or other restricted flow points, will contain a high percentage of free nickel. In other words, it appears that there is a tendency for the disassociation or migration of nickel from the catalyst particles during the fluidized contacting procedure to produce hydrogen and a resulting clinker formation. However, in connection with this problem, it has now been found that modification in composition and/or preparation of catalyst can have direct bearing upon the extent of nickel migration and resulting clinker formation. For example, it has been determined that as the chloride level in the catalyst is increased, then the quantity of clinkers increases; where aluminum chloride has been used as a source of alumina in the preparation of all-alumina or high alumina base spray dried composites, there is, of course, some residual chloride in the composite. On the other hand, it has also been determined that the retention of some halogen through the spray drying stage is desirable or necessary for the preparation of alumina supports that have satisfactory attrition resistance. As a result, it appears that some halogen retention is necessary for obtaining the strong amorphous alumina structure and there may well be minimum washings and aging of the precipitated alumina as a necessary part of the preparation procedure.

It is thus a principal object of the present invention to provide an improved alumina-nickel catalyst which will reduce the clinker formation tendency in a fluidized contacting system for effecting the decomposition of a hydrocarbon stream while at the same time holding attrition resistance to a satisfactory level.

It may also be considered an object of the present invention to utilize a special steam treatment or high humidity calcination step as a part of the finishing treatment for an alumina-nickel decomposition catalyst such that it may be used in a fluidized contacting system.

Broadly, the present invention may be considered to embody both an improved method for the fluidized decomposition of a hydrocarbon stream to produce hydrogen in the presence of a specially prepared alumina-nickel catalyst, as well as an improved treatment procedure in the preparation of a finely divided alumina-nickel catalyst for use in effecting the catalytic decomposition of a gaseous hydrocarbon stream to produce hydrogen so as to minimize the formation of clinkers in the catalytic decomposition system, with said treatment comprising, as a step, subsequent to effecting the formation of composite subdivided particles with essentially alumina as a base and a catalytic amount of nickel as an active component, the subjection of such composite particles to a high humidity calcination step where such particles are in the presence of steam at a temperature above about 1000° F. for at least about two hours.

Preferably, the calcination or pre-sintering step for the composite is carried out at a temperature above 1000° F. and generally in the range of 1300 to 1800° F., although higher temperatures may sometimes be utilized. The time of treatment may be from one to 10 hours, but generally from two to eight hours. The high humidity for the treatment conditions may be steam from any convenient source, but should be free of any impurities and should be supplied in a quantity of from 25% to 80% water vapor in the oxidizing or calcining stream. When the steam-oxidizing treatment is carried out on the alumina particles prior to an impregnation, there is a weakening of the base structure and high attrition losses in the system; however, where the humidity oxidation treatment is carried out on the composite particles, there is substantially no loss of attrition resistance while obtaining the desired reduction in clinker formation in the processing system. The activating nickel component may be added to spray dried alumina base particles by soaking or impregnation, or alternatively, a nickel component may be added by a solution of a nickel salt in the alumina slurry stream carrying to the spray drying equipment. In any case, the calcination appears to satisfactorily reduce the clinker formation when it is carried out on the composite alumina-nickel particles for use in a fluidized system.

As indicated hereinbefore, a high alumina content base on an all-alumina base for the catalyst is preferred to silica-alumina or other typical catalyst support materials. Prior associated work has shown that the over-all activity is best with the high alumina content, with such activity being in part the result of an independent effect exerted by the alumina oxide or by reason of a particular effect of the alumina with the nickel as the preferred active component. Thus, as used herein, the term "alumina" shall be a base material which is at least about 95% alumina. Alumina as a catalyst support may be synthetically prepared or may be of a naturally occurring alumina, such as recovered from bauxite. Synthetically prepared alumina may be of the gel type generally prepared by precipitation methods: for example, an alkaline reagent such as ammonium hydroxide, ammonium carbonate, etc., is commingled with an acidic solution of an aluminum salt which may be an aqueous solution of aluminum chloride, aluminum sulfate, aluminum nitrate and the like, to precipitate the desired alumina. Alternatively, alumina may be precipitated by commingling hydrochloric acid, sulfuric acid, nitric acid or the like, with an alkaline solution of a suitable aluminum salt such as sodium aluminate, potassium aluminate, etc. However, it should be pointed out that alumina from varying sources can materially affect strength or attrition resistance of a finished catalyst. For example, alumina prepared from sodium aluminate resulted in a physically weak catalyst and high attrition losses in a fluidized test unit.

Development work has shown that the alumina hydrogel for the base of the resulting catalyst for the present hydrogen producing system shall have a regulated relatively low anion content. For example, the chloride ion content shall generally be not more than about .05 to 3.0 percent by weight of the base material in the finished fresh catalyst after calcination. Thus, preferably a hydrogel prepared by precipitation from an aluminum chloride solution shall be washed and filtered several times to reduce the chloride concentration to the desired level consistent with attrition resistance aspects. As noted hereinbefore, it is recognized that some chloride content appears to slow down crystallite formation in the alumina structure and effect greater attrition resistance in the finished catalyst and, as a result, should not be entirely removed.

Where the catalyst is desired in a microspherical form for use in a fluidized operation, as for example in the present fluidized hydrogen producing system, the gel may be processed through a spray drier or spinning disc operation which will form microspheres or macrospheres of a desired size. After the microsphere formation, regardless of the source or method of preparation, the alumina support material may be dried and/or subjected to low temperature calcination up to about 900° F. Preliminary high temperature calcination appears to have a detrimental effect on the catalyst strength. The drying may be carried out in any suitable atmosphere, usually being in the presence of air or other oxidizing media; although, in some cases, it may be in the presence of a nitrogen or other inert atmosphere.

The nickel content of the improved catalyst of this invention may be obtained by impregnating the alumina or alumina-nickel support with a suitable aqueous solution of a nickel salt, such as, for example, nickel nitrate, nickel formate or an acid salt such as nickel chloride and nickel sulfate with an ammoniacal solution which will convert the salt to the metal oxide, followed by heating to drive off the volatile components. There may be successive soakings of the support into the impregnating solution or there may be a continuous soaking for a period of one or more hours until the particular type of support acquires the desired amount of the active metal component which will be retained after rinsing and drying of the composite.

However, associated work has shown that good activity and improved attrition resistance is obtained by the procedure of adding the nickel salt solution to the slurry feed of alumina hydrogel such that the catalyst particles are comminuted or spray dried to contain the nickel salt. For example, a nickel nitrate solution is incorporated into the alumina or alumina-nickel hydrogel slurry stream which will generally provide from about 5% to 20% nickel by weight of the finished calcined catalyst particles. For some reason, with the nickel added to the slurry stream ahead of the spray drier, there is better attrition resistance to the finished catalyst than when the particles are impregnated by being soaked in a nickel solution. It is, however, not intended to limit the present invention to the use of any one solution or salt for commingling with the hydrogel slurry which is to be comminuted by the spray drier or the comminuting means. Nor shall there be a limitation to any one impregnating solution for soaking the finely divided base particles to obtain the desired impregnation of nickel content into the composite particles.

As indicated briefly hereinabove, in order to control acidity of the catalyst support and/or finished composite to resist clinker formation in a fluidized system, it is desirable to have some controlled washing of the alumina precipitate or floc prior to the formation of the alumina which is comminuted into the desired finely divided particles. Prior washing operations have generally been carried out in multiple stages to insure the substantially complete removal of acid ions, as for example, the removal of the chloride or nitrate ions which are in the alumina floc at the time of precipitating amorphous alumina from an aluminum chloride or an aluminum nitrate salt solution. A substantially complete removal of the ions has been found to cause undesired relatively rapid crystal growth within the alumina such that boehmite state is attained in a short period of time by aging or by heating. Conversely, the improved operation for providing attrition resistance effects a controlled washing where residual acid ions, depending upon the salt from which the material is prepared, remain in combination with the alumina at the time of preparing a slurry feed for spray drying. The amount of acid ion may vary from about 0.20% to about 0.30% as $Cl^-$ in the hydrogel, depending upon the time involved between the formation of the alumina precipitate and the initiation of the actual comminuting operation, as well as upon the time involved prior to the addition of the nickel salt, or other Iron Group metal salt. In other words, where the manufacturing steps are carried out in a sequential manner leading to the spray drying operation within but a matter of a few hours after the alumina floc formation and washing steps and the addition of the activating metal salt, then there may be a relatively low percentage of acid ion left in the slurry as it is fed to the spray drying equipment. However, on the other hand, where the time period between alumina precipitation step and the metal salt commingling step, and the spray drying step is lengthened and becomes greater than about 10 or 12 hours, then the acid ion content is preferably in the range of about 0.20 $Cl^-$ percent of the amorphous alumina precipitate at the time of preparing such precipitate as an aqueous slurry for the salt commingling and comminution steps.

Another advantageous procedure for controlling crystallite growth in the amorphous alumina precipitate resides in the regulation of temperature during the washing steps as well as during the precipitation of the alumina floc from the aluminum salt by the ammonium hydroxide solution. In other words, the precipitation step may be carried out at a temperature below the normal room temperature and down to the order of about 40° F., so as to reduce the tendency for crystal growth in the alumina hydrogel. Subsequently, instead of effecting the usual six or seven washing stages, for the purification and elimination of acid ions from the precipitate, that are carried out at slightly elevated tmeperatures, there may be a stirring and washing of the precipitate in each of the successive washing stages at a temperature equivalent to about room temperature or at a lower temperature, down to the order of approximately 40° F., to likewise reduce the tendency for crystallite growth in the alumina hydrogel.

In view of the fact that it is desirable to use aluminum chloride, as hereinbefore noted as a source of alumina, and since the chloride level in the finished catalyst has an effect on both attrition resistance and clinker formation, it is then necessary to provide a balanced preparation procedure where there are controlled washings and controlled aging, as well as a controlled calcination, whereby the chloride level is at a minimum consistent with maintaining acceptable level of attrition resistance. Research work carried out in connection with the means for reducing chloride levels discovered that the use of steam or high humidity calcination procedure is far more effective in reducing clinker formation than a high temperature oxidation step. However, as is also noted hereinbefore, it appears that little or no damage to the catalyst composite, with respect to attrition resistance, occurs when the steam calcination is carried out on an alumina-nickel composite rather than on the unimpregnated alumina support. In addition to the effect attributed to the chloride level it has been determined that to some degree the quantity of clinker formation is dependent upon the amount of nickel present in the composite. As a result, a preferred catalyst should contain no more nickel than that which is necessary to aid activity requirements of the catalyst and at the same time no more chloride than that necessary for maintaining adequate strength for the fresh catalyst.

The following examples are presented to illustrate the improved results obtainable from the use of steam along with air in the high temperature oxidation treatment or calcination of catalyst particles being formed for use in a fluidized system.

All of the measuring for clinker formation in the following examples was carried out in a laboratory activity test unit which comprised a quartz reactor, sized approximately 2 inches in diameter by 8 inches in length. This unit is adapted to handle approximately 40 cc. of microspherical catalyst particles in contacting a methane charge stream in a fluidized manner. In all instances, the methane was introduced into the reactor at a gaseous hourly space velocity of about 6150 to effect the contacting of the catalyst at about 1600° F. for a period of 24 seconds. In a continuous cyclic operation, after the conversion period, the catalyst particles were subjected to a nitrogen purge stream for approximately 12 seconds and then subjected to oxidation by an air stream for approximately a 52- to 60-second period of time so as to effect substantial removal of carbon from the catalyst particles. This regeneration step was also followed by a nitrogen purge stream for an approximate 12-second period. All of the test procedures were carried out continuously for at least an 18-hour period of time in order to obtain a satisfactory measure of clinker formation. This series of tests was not directed to catalyst activity; however, a Fisher Gas Chromatograph and a Liston-Becker Infra-red analyzer were used to analyze the effluent products and to determine methane conversion as a measure of catalyst activity.

The testing for attrition in connection with the various catalyst samples was carried out in a test unit which embodies an approximately 27-inch-long by 1½-inch-I.D. lower tube with a perforate disc at the bottom, an enlarged upper 22-inch-long by 5-inch-I.D. chamber, and an overhead fines collecting flask. An air jet stream with a velocity of about 890 feet per second passes upwardly through a 45-gram catalyst sample in the lower tube and effects fluidization and attrition of the catalyst particles as they collide with each other. The weight percent recovery of fines collected in the overhead flask at the end of 12 hours of operation is determined as one measure for comparison purposes. Also, the average hourly rate of fines production for the next 30 hours (from 12 to 42 hours) is calculated to provide another evaluation guide.

*Example I*

An alumina-nickel catalyst for this test operation was prepared by forming an alumina hydrogel by the precipitation thereof from aluminum chloride with ammonium hydroxide. The hydrogel was water washed and filtered several times to partially reduce the chloride concentration and then reslurried for feeding into a spray drier. In this instance a 5-foot diameter pilot plant sized spray drier unit was used to obtain finely divided microspherical particles. High temperature heated air at about 1000° F. was introduced concurrently with the charge stream into the spray drier. The air left the spray drier at about 300° F. to 350° F. such that heat absorbed by the particles was dissipated in the evaporation of entrained water content. The collected spray dried particles were then impregnated with a nickel nitrate solution and dried in rotary dryer means to provide approximately 10% nickel by weight of the composite in the finished catalyst. Subsequently, the impregnated alumina-nickel particles were oxidized in the presence of air at about 1200° F., for about two hours. Chloride content of the finished catalyst was 1.04%.

The thus prepared catalyst was tested in the quartz reactor in the heretofore described cyclic manner. At the end of an 18-hour test period, there was found 362.5 milligrams of clinker formation. Methane conversion at the end of this period was 63.9%. A portion of catalyst subjected to the attrition testing provided an initial fines loss of 3.6% by weight at the end of the first 12 hours of testing, and an average hourly rate of fines production equal to 0.03% for the 12- to 42-hour period.

*Example II*

An alumina-nickel catalyst for this operation was prepared in a manner similar to that set forth for Example I, except, however, after the nickel impregnation of the dried microspheres there was a high humidity calcination step which used 80% steam at a temperature of 1600° F. for a seven-hour period. Chloride content of this steam-calcined fresh catalyst was 0.05%.

This catalyst was then tested in the activity reactor equipment for an 18-hour period and there was no clinker formation found in the system at the end of the test period. A portion of the catalyst subjected to attrition testing provided an initial fines of 3.2% at the end of the 12 hours of testing and an average hourly rate of fines production equal to 0.04% for the 12- to 42-hour period.

*Example III*

The catalyst of this example was prepared by forming spray dried alumina particles in the manner described for Example I; however, prior to impregnation there was a seven hour 80% steam-oxidation treatment at 1600° F. on the particles. Subsequently the formed and steam calcined particles were impregnated with a nickel nitrate solution to provide a resulting finished catalyst of about 10% nickel. The chloride level of the finished catalyst was 0.06% by weight of the composite.

When testing this catalyst in the described manner for 18 hours there was found to be no measurable amount of clinker formation. Methane conversion was 63.6% at the end of the test period. The portion of the catalyst subjected to the attrition testing procedure showed an initial fines loss of 8.0% by weight at the end of the first 12 hours of testing and an average hourly rate of fines product of 0.28% for the 12- to 42-hour period.

*Example IV*

The catalyst composite in this instance was prepared in the same manner as that described for Example I except that the nickel content is slightly less being about 7% by weight of the composite. The chloride content for this dry calcination preparation provided 1.09% of chloride by weight of the finished catalyst.

In the testing procedure at the end of an 18 hour period there was found 150 mg. of clinker formation. The portion of catalyst subjected to attrition testing showed an initial fines loss of 2.6% by weight of the composite at the end of the first 12 hours of testing and an average hourly rate of fines production equal to 0.03% for the 12- to 42-hour period.

*Example V*

The alumina-nickel catalyst for this test was prepared in the same manner as that for Example IV to have approximately 7% nickel by weight of the finished catalyst composite except that the calcination step was carried out with 25% steam content at 1250° F. for about 1½ hours. The chloride content after the calcination was 0.87% by weight of the composite.

After the 18 hour test period, there was found 71.5 mg. of clinker formation in the reactor. Methane conversion at the end of the period was 60.6%. The portion of the catalyst subjected to the attrition testing procedure showed an initial fines loss of 3.1% by weight of the composite at the end of 12 hours and an average hourly rate of fines production equal to .05% for the 12- to 42-hour period.

*Example VI*

The catalyst for this example was prepared in accordance with the procedure for Example V except that during the steam calcination procedure there was 50% steam in the calcination gas stream. The chloride content of the finished catalyst was 0.36% by weight of the composite.

At the end of the test period for this catalyst there was found 36.5 mg. of clinker formation. Methane conversion was 62.1% at the end of the 18-hour period. A portion of catalyst subjected to attrition testing showed an initial fines loss of 3.7% at the end of the first 12 hours and an average hourly rate of fines production equal to 0.06% for the 12- to 42-hour period.

A comparison of the results of the last three examples shows that the steam calcination treatment substantially reduced the clinker formation without materially affecting the attrition resistance and, further, that the 50% steam treatment is more effective for reducing chloride content and clinker formation than was the 25% steam treatment.

*Example VII*

The catalyst for this example was prepared in the same manner as that set forth for Example I with a dry calcination being carried out at 1200° F. However, with this particular batch of catalyst following the impregnation of the spray dried microspheres to provide the approximate 10% nickel content, there was a chloride content in the finished catalyst of only 0.36% as compared with 1.04% chloride in Example I.

At the end of the test period of 18 hours there was found only 8.4 mg. of clinker in the system. Methane conversion at the end of the test was 69.2%. The portion of the catalyst subjected to the attrition testing procedure showed an initial fines loss of 6.5% at the end of the first 12 hours of testing and an average hourly rate of fines production equal to 0.11% for the 12- to 42-hour test period.

*Example VIII*

The alumina-nickel catalyst of this test was prepared in the same manner as that set forth for Example II with 7 hours of high steam content at 1600° F. The chloride content of the finished catalyst was 0.05% by weight of the composite. At the end of the 18 hour test period there was no clinker formation found in the reactor system. Methane conversion was 65.5%. The portion of the catalyst subjected to attrition testing showed an initial fines loss of 7.0% at the end of the first 12 hours of testing and an average hourly rate of fines production equal to 0.20% for the 12- to 42-hour period.

*Example IX*

In this example an all-alumina microspherical base material was formed by the spray drying of an alumina slurry stream in the manner described in Example I. The resulting support particles, after drying and calcination at 930° F. with no steam being present, provided a chloride content of 1.74%. A sample of these base particles subjected to the attrition testing procedure provided an initial fines loss of 4.2% at the end of the first 12 hours of testing and an average hourly rate of fines production equivalent to 0.05% at the end of the 12- to 42-hour period.

*Example X*

The catalyst for this test was prepared from the base material described in Example IX with approximately 10% nickel by weight of the composite being added to the base by a soaking-impregnation procedure. The alumina-nickel composite was calcined in the absence of steam for 2 hours at 1200° F. with a resulting 0.46% chloride content in the finished catalyst.

When this catalyst was tested for hardness, there was found an initial fines loss of 5.2% at the end of the first 12 hours of testing and an average hourly rate of fines production of 0.04% for the 12- to 42-hour period.

*Example XI*

The catalyst used in this test was prepared in the same manner as that for Example X except that there was a high humidity calcination following the nickel impregnation step with 80% steam content in the oxidizing gas stream at 1600° F. for a seven hour period. The chloride content of the finished catalyst was found to be 0.04% by weight of the composite.

In the attrition testing procedure there was found to be an initial fines loss of 5.8% at the end of the first 12 hours of testing and an average hourly rate of fines production equivalent to 0.19% for the 12- to 42-hour test period. In the activity testing procedure, there was found to be 10.3 milligrams of clinker formation at the end of the 18-hour period.

For comparison purposes the results of the various tests carried out in the aforedescribed examples are summarized in the accompanying table.

A comparison of the results found from the various preparation procedures readily shows that the catalyst with the reduced chloride contents will result in less clinker formation in the system where the catalyst is used in a fluidized manner for the decomposition of the gaseous hydrocarbon stream. It may also be noted that the use of high steam concentrations appears to be more effective in reducing the chloride content in the catalyst composite and that the attrition resistance is not unduly lowered where there has been nickel addition to the alumina particles prior to the steam-calcination procedure. Specifically, reference to Examples I, VII and VIII shows that reduced chloride content is particularly effective for reducing clinker formation, although not particularly advantageous in maintaining good attrition resistance for it will be noted that the steam calcined catalyst has relatively high attrition losses. Comparison may also be made with reference to Examples IX, X and XI where the chloride content was reduced in the later test procedures and showed substantial reductions in clinker formation. On the other hand, the attrition resistance for the catalyst sample of the Example XI was relatively low and indicates the need for maintaining a given amount of chloride content in the finished catalyst such that catalyst losses in a commercial system will not be unduly high.

Example III shows that the procedure of lowering chloride content on the base particles, i.e., prior to nickel impregnation, was satisfactory for eliminating clinker formation but generally unsatisfactory from the aspect of attrition resistance.

TABLE

| Ex. | Catalyst Preparation | Percent Chloride | Attrition | | Clinker Formation (milligrams) |
|---|---|---|---|---|---|
| | | | Percent Fines 1st 12 Hrs. | Avg. Hrly. Rate | |
| I | $Al_2O_3$+10% Ni impreg., 1,200° F. Oxid. Dry | 1.04 | 3.6 | .03 | 362.5 |
| II | $Al_2O_3$+10% Ni Impreg. 7 Hrs. Oxid., 80% Steam at 1,600° F. | 0.05 | 3.2 | .04 | None |
| III | $Al_2O_3$ Oxid. with 80% Steam for 7 Hrs. at 1,600° F., then Ni Impreg. | 0.06 | 8.0 | .28 | None |
| IV | $Al_2O_3$+7% Ni Impreg. 2 Hrs. at 1,250° F. Oxid. Dry. | 1.09 | 2.6 | .03 | 150. |
| V | $Al_2O_3$+7% Ni Impreg. at 1,250° F. Oxid. with 25% Steam. | .87 | 3.1 | .05 | 71.5 |
| VI | $Al_2O_3$+7% Ni Impreg. at 1,250° F. Oxid. with 50% Steam. | .36 | 3.7 | .06 | 36.5 |
| VII | $Al_2O_3$+10% Ni Impreg. at 1,200° F. Oxid, Dry | .36 | 6.5 | .11 | 8.4 |
| VIII | $Al_2O_3$+10% Ni Impreg. 7 Hrs. at 1,600° F.+80% Steam. | .05 | 7.0 | .20 | None |
| IX | $Al_2O_3$ Base | 1.74 | 4.2 | .05 | None |
| X | $Al_2O_3$+10% Ni Impreg. at 1,200° F. Oxid. Dry | .46 | 5.2 | .04 | 136.4 |
| XI | $Al_2O_3$+10% Ni Impreg. 7 Hrs. at 1,600° F.+80% Steam. | .04 | 5.8 | .19 | 10.3 |

I claim as my invention:

1. In a process for producing hydrogen by the fluidized contacting of a normally gaseous hydrocarbon stream at decomposition conditions with subdivided alumina-nickel catalyst particles, the improved processing operation to preclude nickle disassociation from the particles and clinker formation in the contacting zones which comprises ontacting such hydrocarbon stream with subdivided essentially alumina-nickel catalyst particles formed as a composite without having any high temperature oxidation prior to the addition of the nickel to the composite, drying the formed composite particles and then subjecting them to a calcination step in a calcining gas stream containing from 25% to 80% by volume of steam at a temperature above about 1000° F. for at least a two-hour period.

2. In the preparation of a subdivided alumina-nickel catalyst for use in a fluidized system for contacting and decomposing a gaseous hydrocarbon stream to effect the production of hydrogen, the improved method of producing the decomposition catalyst so as to minimize nickel migration therefrom and to reduce clinker formation in the fluidized system, which comprises effecting the formation of composite subdivided catalyst particles that are composed essentially of alumina as a base and having nickel as an active component and such formation being effected without having any high temperature oxidation prior to the nickel addition to the composite particles, drying the formed composite particles and then subjecting them to a calcination step in an oxidizing stream containing from 25% to 80% by volume of steam at a temperature above about 1000° F. for at least a two hour period.

3. In the preparation of a subdivided alumina-nickel catalyst for use in a fluidized system for contacting and decomposing a gaseous hydrocarbon stream to effect the production of hydrogen, the improved method of producing the decomposition catalyst so as to minimize nickel migration therefrom and to reduce clinker formation in the fluidized system, which comprises effecting the comminution of subdivided alumina particles, drying such particles without effecting calcination thereof and then effecting the impregnation thereof with a solution of a nickel salt to provide an activating amount of nickel, drying the impregnated particles and then subjecting them to a calcination step in an oxidizing stream containing from 25% to 80% by volume of steam at a temperature above 1000° F. for at least a two hour period.

4. In the preparation of a subdivided alumina-nickel catalyst for use in a fluidized system for contacting and decomposing a gaseous hydrocarbon stream to effect the production of hydrogen, the improved method of producing the decomposition catalyst so as to minimize nickel migration therefrom and to reduce clinker formation in the fluidized system, which comprises mixing a nickel salt solution with an alumina hydrogel slurry stream in an amount providing a catalytically active finished catalyst and effecting the comminution of the mixture to form resulting finely divided composite particles, and then subsequently calcining such formed composite particles in an oxidizing stream containing from 25% to 80% by volume of steam at temperature above about 1000° F. for at least a two-hour period.

References Cited

UNITED STATES PATENTS

| | | | |
|---|---|---|---|
| 2,482,866 | 9/1949 | Phinney | 23—212 |
| 2,642,337 | 6/1953 | Newsome | 23—141 X |
| 3,119,667 | 1/1964 | McMahon | 23—212 |
| 3,186,957 | 6/1965 | Stiles | 252—466 |

DANIEL E. WYMAN, *Primary Examiner.*

OSCAR R. VERTIZ, *Examiner.*

G. T. OZAKI, *Assistant Examiner.*